(12) United States Patent
Wakamori et al.

(10) Patent No.: US 7,374,157 B2
(45) Date of Patent: May 20, 2008

(54) SPRING ASSEMBLY AND METHOD FOR MANUFACTURING THE SAME

(75) Inventors: Masami Wakamori, Kanagawa (JP); Toshie Fueki, Kanagawa (JP)

(73) Assignee: Piolax, Inc., Yokohama-shi, Kanagawa (JP)

( * ) Notice: Subject to any disclaimer, the term of this patent is extended or adjusted under 35 U.S.C. 154(b) by 259 days.

(21) Appl. No.: 10/687,583

(22) Filed: Oct. 20, 2003

(65) Prior Publication Data

US 2004/0107560 A1   Jun. 10, 2004

(30) Foreign Application Priority Data

Oct. 21, 2002 (JP) ............................ P. 2002-305315
Jul. 2, 2003 (JP) ............................ P. 2003-190077

(51) Int. Cl.
*F16F 1/06* (2006.01)
(52) U.S. Cl. ................... 267/179; 29/512; 29/896.91
(58) Field of Classification Search ............. 267/179; 29/512, 520, 896.9, 896.91
See application file for complete search history.

(56) References Cited

U.S. PATENT DOCUMENTS

| | | | | |
|---|---|---|---|---|
| 2,432,949 A | * | 12/1947 | Thorngren | 29/512 |
| 3,122,829 A | * | 3/1964 | Schaad et al. | 29/436 |
| 3,866,287 A | * | 2/1975 | Dulude et al. | 29/896.91 |
| 4,371,154 A | * | 2/1983 | Winbigler | 267/179 |
| 4,756,071 A | * | 7/1988 | Takeuchi | 29/515 |
| 5,772,191 A | * | 6/1998 | Nakano et al. | 267/289 |
| 6,004,086 A | * | 12/1999 | Gand et al. | 411/38 |
| 2005/0017422 A1 | * | 1/2005 | Wakamori et al. | 267/179 |

FOREIGN PATENT DOCUMENTS

| | | |
|---|---|---|
| JP | 61-123460 | 6/1986 |
| JP | 03-2934 | 1/1991 |
| JP | 06-159418 | 6/1994 |
| JP | 6-226559 | 8/1994 |
| JP | 10-311357 | 11/1998 |
| JP | 3288458 | 3/2002 |
| JP | 2003-025165 | 1/2003 |

OTHER PUBLICATIONS

European Search Report dated Jun. 29, 2004.
Chinese office Action dated Mar. 23, 2007 with an English translation.

* cited by examiner

*Primary Examiner*—Bradley King
(74) *Attorney, Agent, or Firm*—McGinn IP Law Group, PLLC (57) ABSTRACT

A manufacturing method of a spring assembly, assembles an annular plate and a compression coil spring. The method includes forming a protrusion having a tapered portion on the annular plate, and inserting a punch including a first portion having a larger diameter than an inner diameter of a tip end of the tapered portion from the tip end side into the protrusion to expand the tip end of the tapered portion. The expansion of the tip end of the tapered portion involves expanding a base portion of the protrusion, which extends the tapered portion and has a larger inner diameter than that of the tip end of the tapered portion, along a surface of an end turn of the compression coil spring.

20 Claims, 6 Drawing Sheets

SPRING ASSEMBLY AND METHOD FOR MANUFACTURING THE SAME

The present disclosure relates to Japanese Patent Application No.2002-305315 filed Oct. 21, 2002 and Japanese Patent Application No.2003-190077 filed Jul. 2, 2003, which are incorporated herein by reference in its entirety.

BACKGROUND OF THE INVENTION

1. Field of the Invention

This invention relates to a spring assembly, which is used as, for example, a return spring member for a multi-plate clutch piston in a clutch mechanism of an automatic transmission of a motor vehicle, and a method for manufacturing the same.

2. Description of the Related Art

Conventionally, this kind of spring assembly, although not shown, includes two annular plates and plural compressing springs arranged at regular intervals in a circumferential direction of the annual plates and fixed to these annular plates. In actual assembling, end turns of the compression coil springs are set to outer peripheries of protrusions formed on an inside surfaces of each annular plate to face to each other. Then, each protrusion is expanded outwardly by using a punch for caulking, so that the outer peripheries of the protrusions and the inside surfaces of the annular plates retain the end turns of the compression coil springs.

With such a configuration, in the process where one end turn of the compression coil spring is attached to one annular plate, the punch for caulking can be easily caused to approach the protrusion. Thus, the protrusion can be caulked relatively easily. On the other hand, in the process where the other end turn of the compression coil spring is attached to the other annular plate cannot be inserted into an area between the annular plates, easily. In this case, a very difficult and troublesome operation is required.

In order to avoid this, a method has been proposed in which when the one end turn of the compression coil spring is attached to the one annular plate, the protrusion is caulked as before by using an ordinary punch for caulking. On the other hand, when the other end turn of the compression coil spring is attached to the other annular plate, the protrusion is caulked by using a longitudinal-dividing punch and diameter-expanding pin.

Specifically, the longitudinal-dividing punch has an outer diameter, which is slightly smaller than an inner diameter of the protrusion. A tip end thereof is divided by defining a division groove to be expandable. The diameter-expanding pin has an outer diameter enough to be inserted into the protrusion of the other annular plate. A sharp tip end thereof is guided into the division groove of the longitudinal-dividing punch, so that the tip end of the longitudinal-dividing punch can be expanded.

While the sharp tip end of the expanding pin is facing the protrusion of the other annular plate to be undergone the caulking operation, the tip end of the longitudinal-dividing punch inserted through the protrusion on the one annular plate, which has already been caulked, is lowered. As a result, the sharp tip end of the expanding pin is guided into the division groove to enlarge the tip end of the longitudinal-dividing punch. Thus, it becomes possible to expand the protrusion outwardly and caulk the protrusion. (see Japanese Patent No. 3288458).

Therefore, in the conventional manufacturing method, the protrusion of the other annular plate can be easily caulked by using the longitudinal-dividing punch and diameter-extending pin. Therefore, the operation of assembling the other annular plate and the compressing coil pin can be improved. However, when the protrusion is caulked, the entire periphery of the protrusion is not uniformly diameter-expanded, but the protrusion is expanded only partially at the tip end of the longitudinal-dividing punch, which is divided by the division grooves. Thus, the retaining force of the compression coil spring on the other annular plate is lowered, so that the compression coil spring might be detached therefrom. Further, since the tip end of the longitudinal-dividing punch itself is divided through the division grooves, the strength of the tip end is low so that the tip end is apt to break or wear.

SUMMARY OF THE INVENTION

The invention has been accomplished in order to solve such a conventional problem. According to a first aspect of the invention, a manufacturing method of a spring assembly assembles an annular plate and a compression coil spring. The method includes forming a protrusion having a tapered portion on the annular plate, and inserting a punch including a first portion having a larger diameter than an inner diameter of a tip end of the tapered portion from the tip end side into the protrusion to expand at least part of the tapered portion. The expansion of the at least part of the tapered portion involves expanding a base portion of the protrusion, which continues the tapered portion and has a larger inner diameter than that of the tip end of the tapered portion, along a surface of an end turn of the compression coil spring.

According to a second aspect of the invention, in the first aspect of the invention, the annular plate is two annular plates. The forming is forming the protrusion on each of annular plates. The inserting is inserting the punch into the protrusion of one of the annular plates. The method further includes setting one end turn of the compression coil spring on the protrusion of the one of the annular plates, setting the other end turn of the compression coil spring on the protrusion of the other of the annular plates, and inserting the punch into the protrusion of the other of the annular plates through the expanded protrusion of the one of the annular plates to expand at least part of the protrusion of the other of the annular plates.

According to a third aspect of the invention, in one of the first and second aspects of the invention, the protrusion has a parallel and cylindrical shape up to a height being equal to a diameter of wire of an end turn of the compression coil spring. The protrusion has a tapered shape at a height exceeding the diameter of the wire.

According to a fourth aspect of the invention, in one of the first and second aspects of the invention, the protrusion has a parallel and cylindrical shape up to a height being equal to a diameter of wire of an end turn of the compression coil spring. The protrusion has an inverse-tapered shape, which inclines inward and downward, at a height exceeding the diameter of the wire.

According to a fifth aspect of the invention, in one of the first and second aspects of the invention, the protrusion has a parallel and cylindrical shape up to a height being equal to a diameter of wire of an end turn of the compression coil spring. The protrusion has a shape bent inward at a right angle at a height exceeding the diameter of the wire.

According to a sixth aspect of the invention, a spring assembly includes an annular plate, and a compression coil spring. A protrusion formed on the annular plate is caulked to assemble the annular plate and the compression coil spring. The protrusion is folded inward at a height exceeding a radius of wire of an end turn of the compression coil spring and is superposed itself doubly Accordingly, in the first aspect of the invention, when the punch is inserted from the tip end side of the tapered portion of the protrusion and lowered, the tapered portion of the protrusion is expanded because of action of the diameter of the punch. Simultaneously, the base portion of the protrusion, which has the larger diameter and continues the tapered portion, is expanded along an entire circumference of the surface of the end turn of the compression coil spring. Therefore, the end turn of the compression coil spring can be retained surely and securely.

In the second aspect of the invention, by forming the tapered portion for each of the two annular plates, these two annular plates are commonly used until the final step. Thus, the manufacturing process is very economical inclusive of the punch to be used. Further, likewise, the caulking state along the entire circumference can be realized. Thus, the end turns of the compression coil spring can be retained surely and securely.

In the third to fifth aspects of the invention, since the protrusion has a parallel and cylindrical shape at the height being equal to the diameter of the wire of the end turn of the compression spring. The protrusion has the tapered shape, the inverse-tapered shape inclining inward and downward, or the shape bent inward at the right angle. Thus, this configuration positively promotes to increase the diameter of the protrusion over the entire circumference.

In the sixth aspect of the invention, the protrusion is folded inward at the height exceeding the radius of the wire of the end turn of the compression coil spring so that it overlaps doubly. This provides a spring assembly with strong retaining force of the compression coil spring.

DETAILED DESCRIPTION OF THE PREFERRED EMBODIMENTS

Now referring to the drawings, an explanation will be given of various embodiments of the invention in detail. A spring assembly according to a first embodiment includes two annular plates 1A and 1B, and a plurality of compressing springs 2 arranged at regular intervals in a circumferential direction of the annual plates 1A and 1B and fixed to these annular plates 1A and 1B. A method for manufacturing the spring assembly includes expanding each of protrusions 4A and 4B formed on the two annular plates 1A and 1B outwardly so that the outer peripheries of the protrusions 4A and 4B and the inside surfaces of the annular plates 1A and 1B retain end turns 2a and 2b of the compression coil springs 2.

Figure 1A:
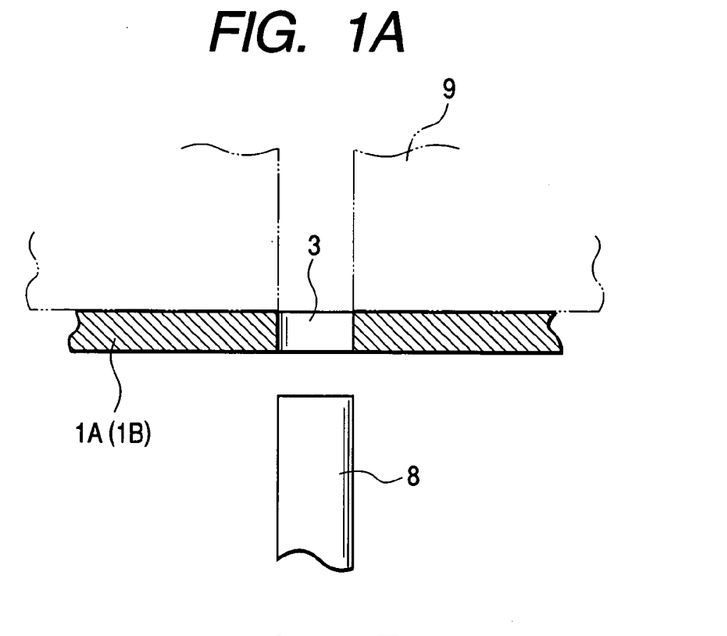
FIGS. 1A and 1B are views for explaining a step of forming a protrusion with respect to an annular plate in a manufacturing method according to a first embodiment of this invention.
Figure 1B:
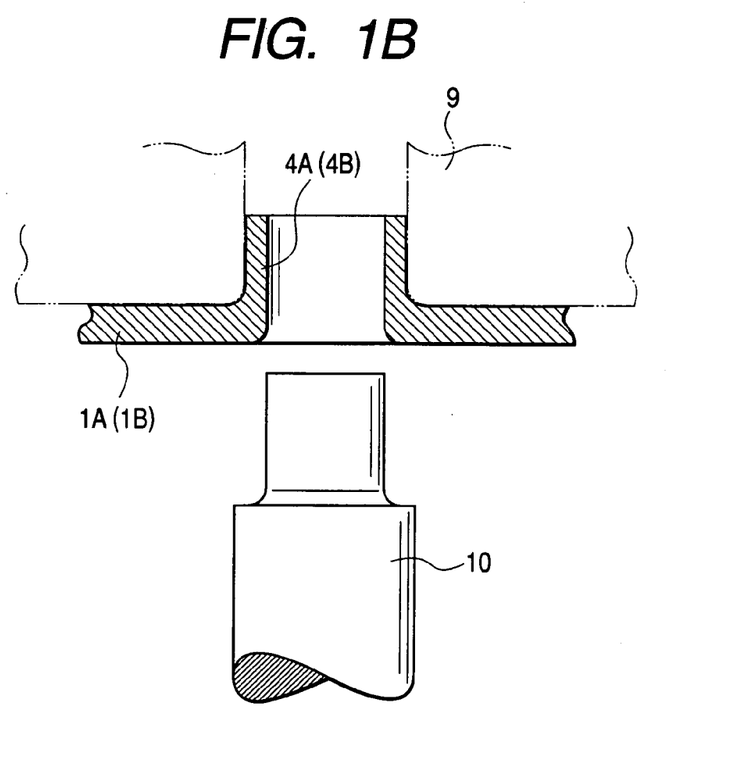

In the first embodiment, in a case of forming cylindrical protrusions 4A and 4B extending higher than a radius of wire of the end turn of the compression coil spring 2 on the inside surfaces of the two annular plates 1A and 1B facing each other, a punching process using a punch 8 for the punching process and a die 9 is applied to the annular plates 1A and 1B to form a hole 3 as shown in FIG. 1A. Thereafter, as shown in FIG. 1B, a burring process using a punch 10 being slightly larger than the punch 8 is performed to form the cylindrical and parallel protrusions 4A and 4B, which protrude toward the counterpart annular plates 1A and 1B. To this step, since the same steps are adopted for the two annular plates 1A and 1B, the annular plates 1A and 1B are commonly used and hence economical.

Figure 2:
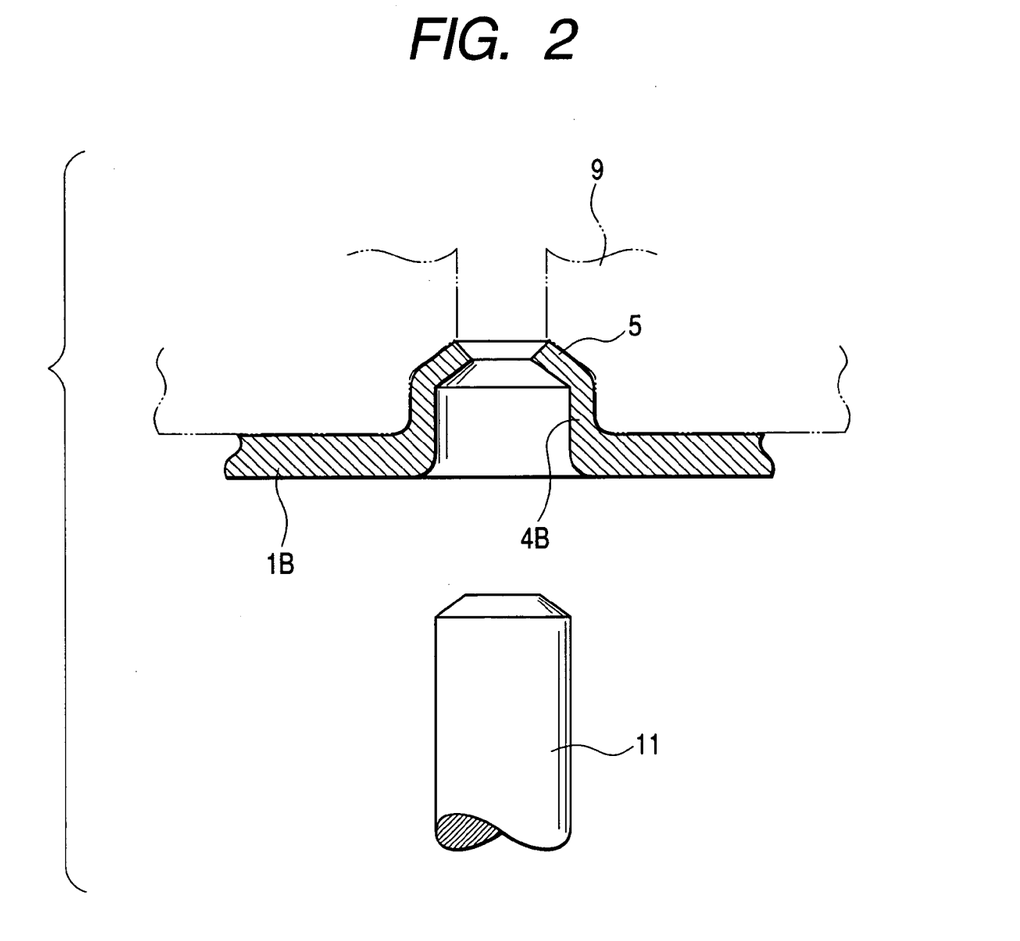
FIG. 2 is a view for explaining a step of forming a tapered portion with respect to the other annular plate by an additional processing.

Therefore, the one annular plate 1A is used as it is. On the other hand, as shown in FIG. 2, an additional process using a punch 11 for squeezing is performed to form a taper-shaped portion 5 at an tip end portion of the protrusion 4B. In this case, preferably the protrusion has the parallel and cylindrical shape up to the diameter of the wire of the end turn of the compression coil spring 2, and has the taper-shaped portion 5 at a height exceeding the diameter. However, if the wire of the end turn of the compression coil spring 2 is cut, the height of the protrusion 4B may be made lower than the radius of the wire of the end turn.

Figure 3A:
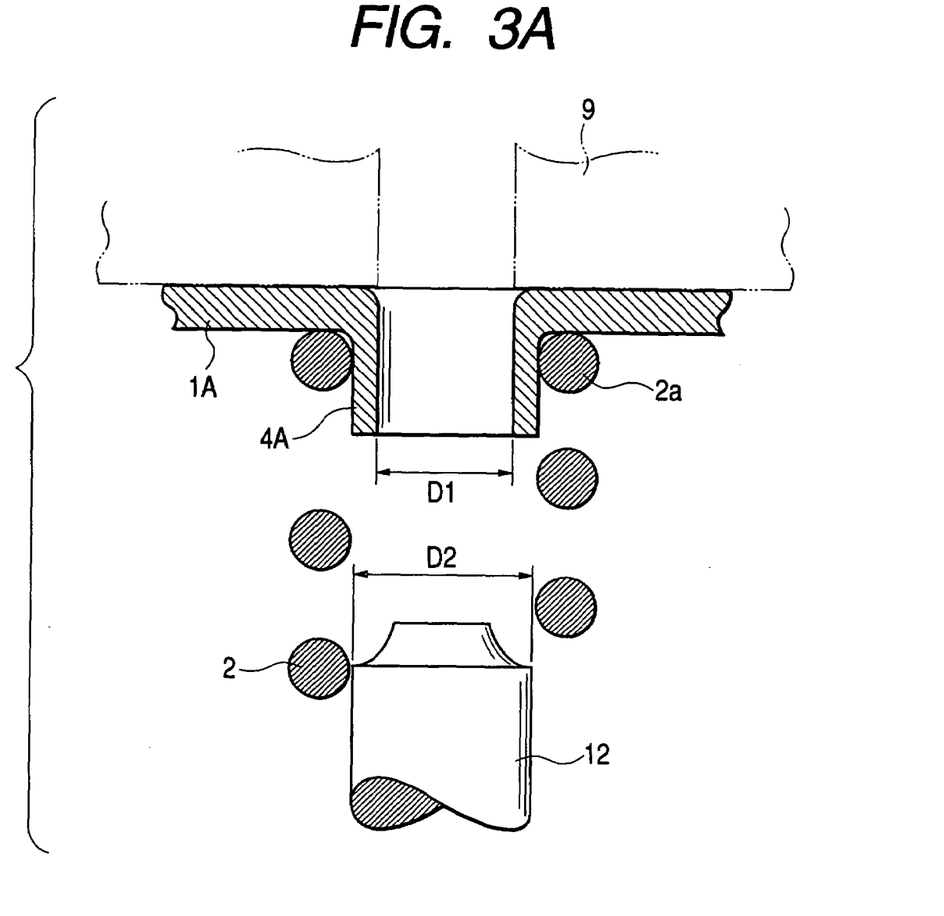
FIG. 3A is a view for explaining a step of caulking one end turn of a compression coil spring and the one annular plate.
Figure 3B:
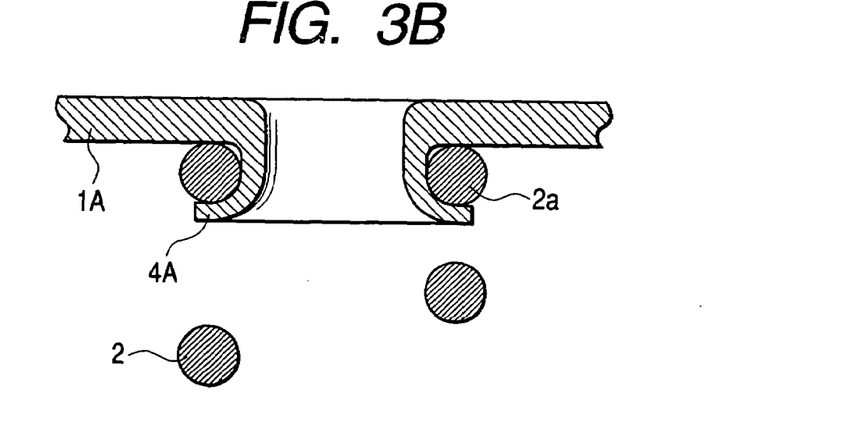
FIG. 3B is a view for explaining the caulking state.

Accordingly, in such configuration, in order to mount the compression coil springs 2 between the two annular plates 1A and 1B, first, the one end turn 2a of the compression coil spring 2 is mounted on the one annular plate 1A. In this case, as with the related art described above, the one end turn 2a of the compression coil spring 2 is set on the outer periphery of the protrusion 4A having a simply parallel and cylindrical shape. Then, the protrusion 4A is expanded outwardly by using a punch 12 having a diameter D2 larger than an inner diameter D1 of the protrusion 4A. Thereby, as shown in FIG. 3B, the entire circumference of the one end turn 2a of the compression coil spring 2 is sandwiched between the outer periphery of the protrusion 4A and the inside surface of the annular plate 1. Therefore, a relationship D1<D2 is satisfied at this time.

Figure 4A:
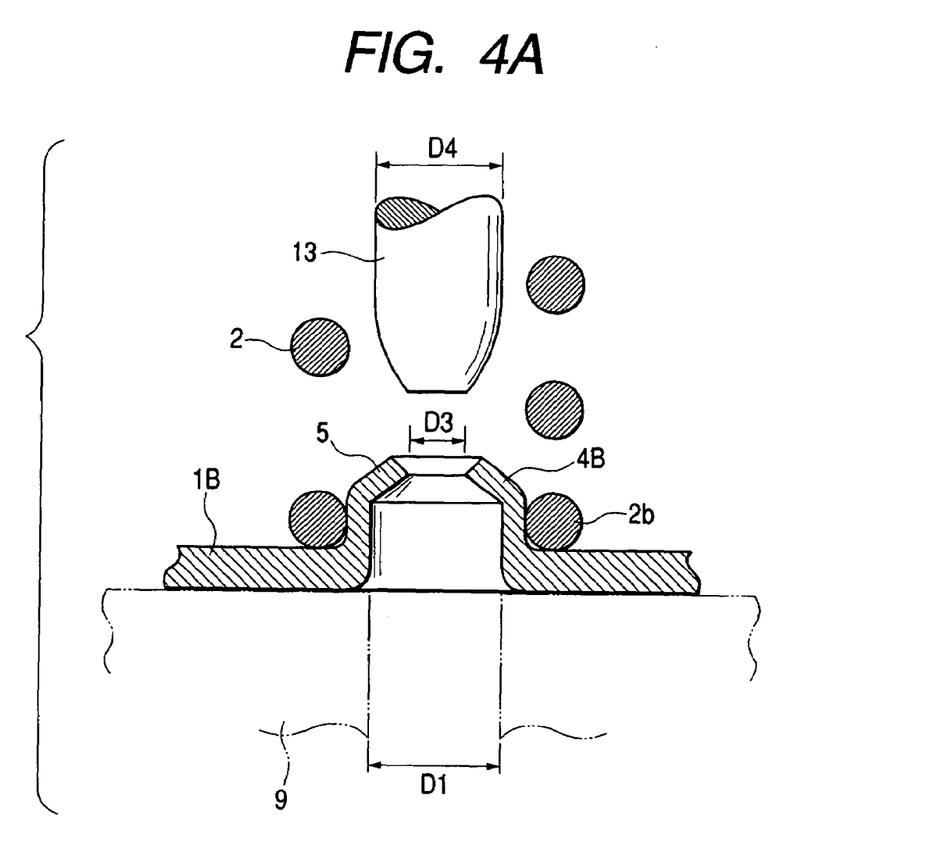
FIG. 4A is a view for explaining a step of caulking the other end turn of the compression coil spring and the other annular plate.
Figure 4B:
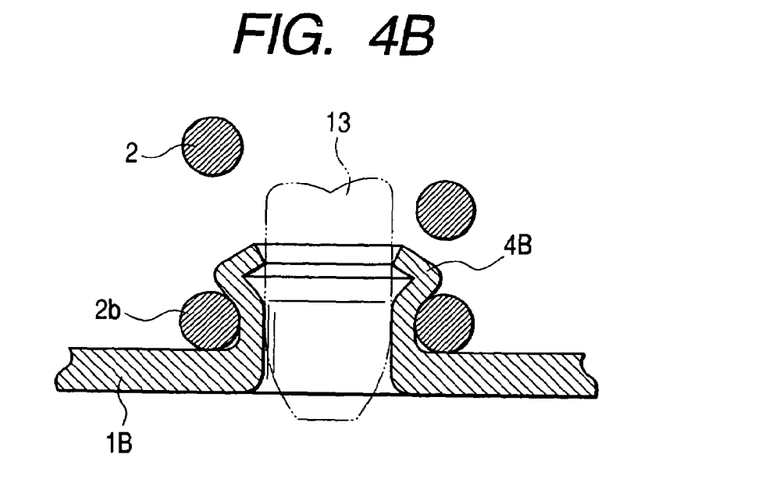
FIG. 4B is a view for explaining the caulking state.

Next, the other end turn 2b of the compression coil spring 2 is mounted on the other annular plate 1B. In this case, as with the above described, as shown in FIG. 4A, the other end turn 2b of the compression coil spring 2 is set on the outer periphery of the tapered protrusion 4B. Then, a punch 13 having a diameter D4 larger than the inner diameter D3 of the tapered portion 5 of the protrusion 4B is inserted and lowered through the protrusion 4A of the one annular plate 1A, which has already been caulked, toward the protrusion 4B of the other annular plate 1B. Thereby, first the tapered portion 5 of the protrusion 4B is expanded gradually. The expansion of the tapered portion 5 involves expanding a base portion, which has a larger diameter than the tapered portion 5 and continues the tapered portion 5, outwardly. Thus, as shown in FIG. 4B, the other end turn 2b of the compression coil spring 2 is simply sandwiched by the outer periphery of the protrusion 4B and the inside surface of the annular plate 1B. In this case, a relationship D3<D4<D1 is satisfied.

Further, in this caulking state, in not only the one annular plate 1A, but also the other annular plate 1B, the entire periphery of the protrusion is expanded along the surface of the end turn of the compression coil spring 2. Therefore, in comparison with the manufacturing method disclosed in the related art, particularly, retaining of the compression coil spring 2 on the other annular plate 1B can be made surely and securely. Also, the mounting operation can be simplified greatly.

Figure 5A:
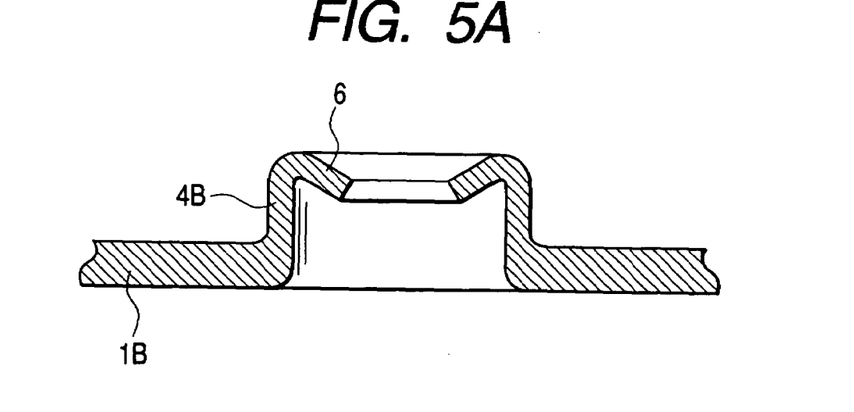
FIGS. 5A and 5B are views for explaining other examples of a tapered protrusion.
Figure 5B:
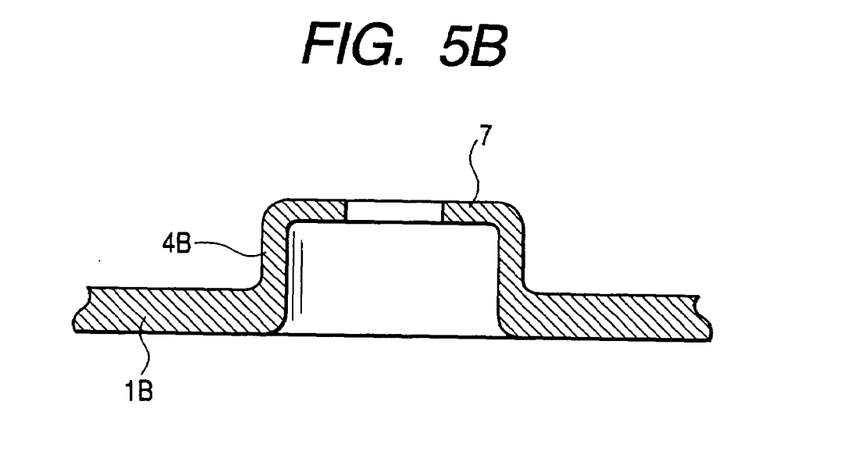

Incidentally, in the first embodiment described above, the protrusion 4B is formed on the other annular plate 1B to have the parallel and cylindrical shape up to a height being equal to the diameter of the wire of the end turn of the compression coil spring 2 and have the tapered shape portion 5 at a height exceeding the diameter. However, the invention is not limited to such a configuration. For example, as shown in FIG. 5, at the height exceeding the diameter, an inverse-tapered portion 6, which inclines inward and downward, may be formed. Alternatively, a portion 7 bent inward at a right angle may be formed. With these modifications, the same caulking state can be obtained.

Figure 6:
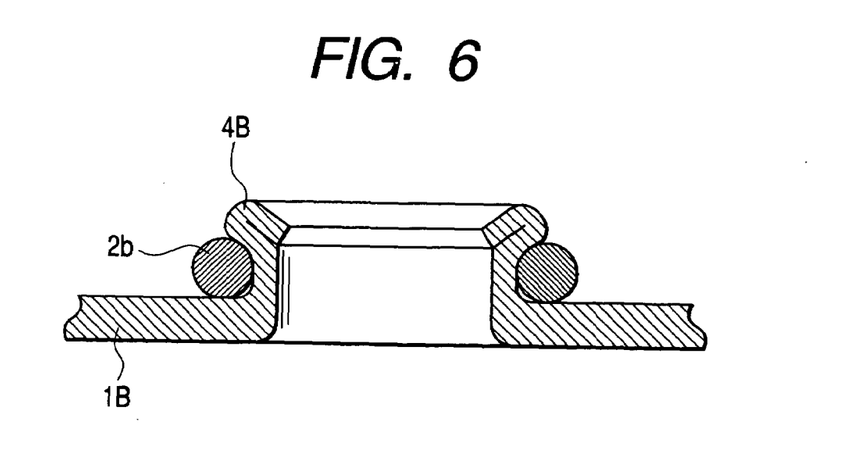
FIG. 6 is a view for explaining a caulking state of tapered protrusion of another example.

Particularly, in these cases, as shown in FIG. 6, the protrusion 4B is folded inward at the height larger than the diameter of the wire of the end turn of the compression coil spring 2 so that it overlaps doubly. This provides a spring assembly with strong retaining force on the compression coil spring 2.

Figure 7:
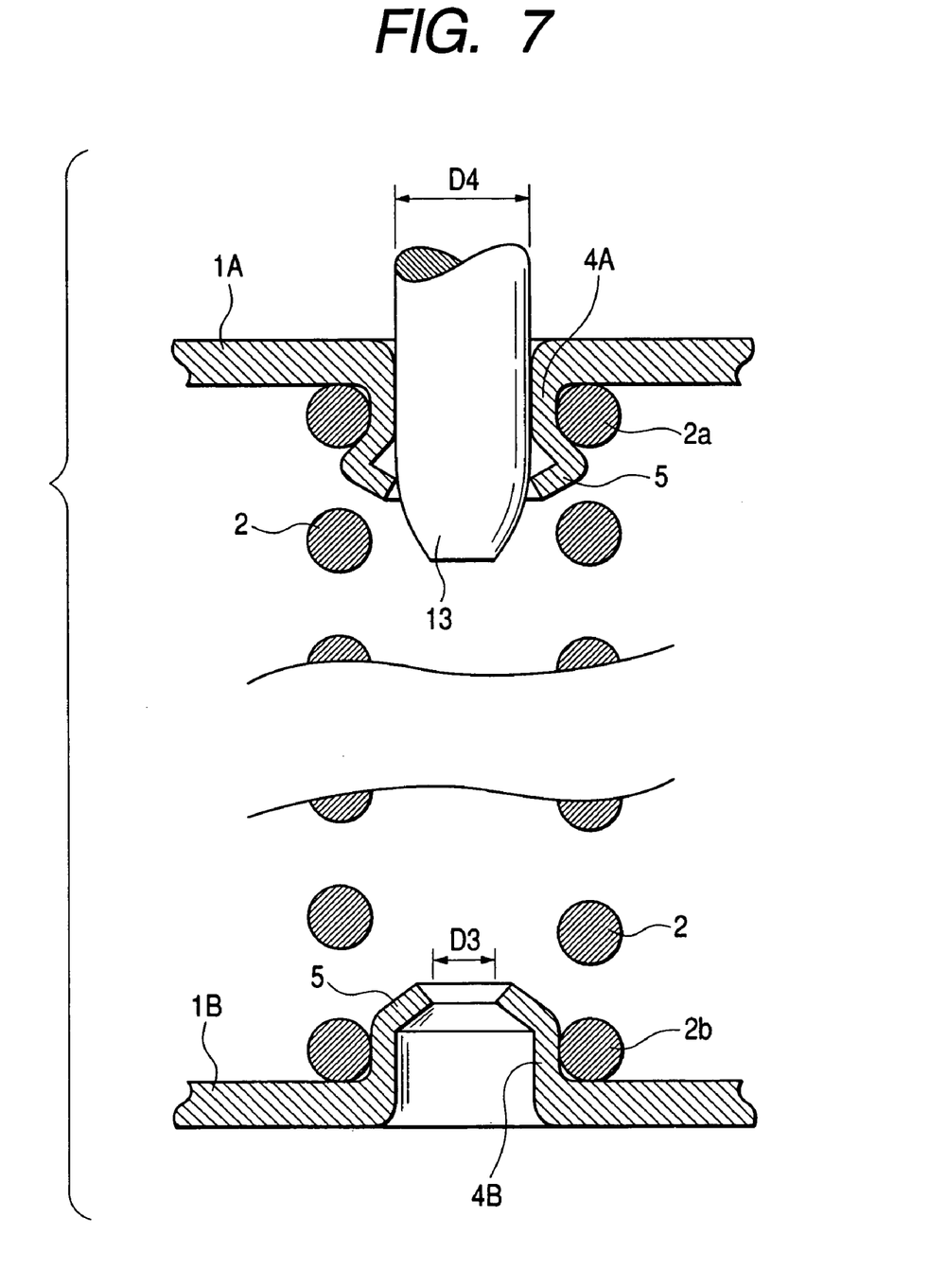
FIG. 7 is a view for explaining a state where protrusion of each of two annular plates are formed in a tapered shape under a manufacturing method according to a second embodiment of the invention.

An explanation will be given of a spring assembly according to a second embodiment of the invention. In the first embodiment described above, for only the other annular plate 1B, the tapered shape portion 5 is formed at the tip end of the protrusion 4B as additional processing. On the other hand, in the second embodiment, as shown in FIG. 7, the tapered shape portion 5 is formed not only at the other annular plate 1B but also at the tip end of the protrusion 4A of the one annular plate 1A. Therefore, until the final step, the two annular plates 1A and 1B are commonly used.

Accordingly, it is needless to say that in comparison with the first embodiment, the second embodiment is more economical. In addition, in actual caulking, although not specifically shown in the drawing, the one end turn 2a of the compression coil spring 2 is set on the protrusion 4A of the one annular plate 1A and then, the punch 13 having the larger diameter D4 than the inner diameter D3 of the tapered portion 5 is inserted into the tapered portion 5 of the protrusion 4A from the tapered portion side to expand the protrusion 4A. On the other hand, the other end turn 2b of the compression coil spring 2 is set on the protrusion 4B of the other annular plate 1B. Then, as shown in the drawing, the same punch 13 having the larger diameter D4 than the inner diameter D3 of the tapered portion 5 is inserted into the tapered portion 5 of the protrusion 4B through the expanded protrusion 4A of the one annular plate 1A to expand the protrusion 4B. As a result, the one end turn 2a and the other end turn 2b of the compression coil spring 2 are retained by the outer peripheries of the protrusions 4A and 4B and the inside surfaces of the annular plates 1A and 1B. Further, in this case, the entire circumference of the end turns 2a and 2b are caulked. Thus, the end turns 2a and 2b of the compression coil spring 2 can be retained surely and securely.

In the second embodiment also, the tapered shape portion 5 is formed at the tip end of each of the protrusions 4A and 4B. In this case also, the inverse-tapered portion 6 as shown in FIG. 5A or the portion 7 bent inward at a right angle as shown in FIG. 5B may be formed. In this second embodiment also, the protrusions 4A, 4B are formed in a parallel and cylindrical shape up to a height being equal to the diameter of the wire of the end turn of the compression coil spring 2 and to have the tapered shape portion 5, 6, or 7 at a height exceeding the diameter.

Accordingly, the embodiments of the invention employ the above-described configuration. Thereby, when the punch is inserted from the side of the tapered portion of the protrusion and lowered, an action of a diameter portion of the punch expands the tip end of the tapered portion of the protrusion. Simultaneously, the base portion of the protrusion, which has a large diameter and continues the tapered portion, expands along the entire circumferential surface of the end turn of the compression coil spring. Thus, the end turn of the compression coil spring can be retained surely and securely.

Also, the tapered protrusions are formed on the two annular plates. Thereby, until the final step, the two annular plates are used commonly. Thus, the manufacturing process is very economical inclusive of the punch to be used. Further, likewise, the caulking state over the entire circumference can be realized so that the end turns of the compression coil spring can be retained surely and securely.

Further, the protrusion is folded inward at the height larger than the diameter of the wire of the end turn of the compression coil spring so that it overlaps doubly. This provides a spring assembly with strong retaining force on the compression coil spring.

What is claimed is:

1. A manufacturing method of a spring assembly, for assembling an annular plate and a compression coil spring, the method comprising:
    forming a protrusion having a tapered portion that is folded inwardly on the annular plate; and
    inserting a punch, including a first portion having a larger diameter than an inner diameter of a tip end of the tapered portion, from the tip end side of said protrusion toward a plate portion of said annular plate and into the protrusion to expand at least part of the tapered portion, wherein:
    the expansion of the at least part of the tapered portion involves expanding a base portion of the protrusion adjacent the tapered portion and has a larger inner diameter than that of the tip end of the tapered portion, along a surface of an end turn of the compression coil spring, wherein the protrusion extends from the plate portion toward the tip portion, wherein said diameter of said first portion of said punch is smaller than an inner diameter of said protrusion adjacent to said plate portion.

2. The method according to claim 1, wherein:
    the annular plate comprises two annular plates;
    the forming comprises forming the protrusion on each of annular plates;
    the inserting comprises inserting the punch into the protrusion of one of the annular plates,
    the method further comprising:
    setting one end turn of the compression coil spring on the protrusion of the one of the annular plates;
    setting the other end turn of the compression coil spring on the protrusion of the other of the annular plates; and
    inserting the punch into the protrusion of the other of the annular plates through the expanded protrusion of the one of the annular plates to expand at least part of the protrusion of the other of the annular plates.

3. The manufacturing method according to claim 1, wherein:
    the protrusion has a parallel and cylindrical shape up to a height being equal to a diameter of a wire of an end turn of the compression coil spring; and
    the protrusion has a tapered shape at a height exceeding the diameter of the wire.

4. The manufacturing method according to claim 2, wherein:
    the protrusions have a parallel and cylindrical shape up to a height being equal to a diameter of wire of the end turns of the compression coil spring; and
    the protrusions have a tapered shape at a height exceeding the diameter of the wire.

5. The manufacturing method according to claim 1, wherein:
    the protrusion has a parallel and cylindrical shape up to a height being equal to a diameter of wire of an end turn of the compression coil spring; and the protrusion has an inverse-tapered shape, which inclines inward and downward, at a height exceeding the diameter of the wire.

6. The manufacturing method according to claim 2, wherein:
the protrusions have a parallel and cylindrical shape up to a height being equal to a diameter of wire of the end turns of the compression coil spring; and
the protrusions have an inverse-tapered shape, which inclines inward and downward, at a height exceeding the diameter of the wire.

7. The manufacturing method according to claim 1, wherein:
the protrusion has a parallel and cylindrical shape up to a height being equal to a diameter of wire of an end turn of the compression coil spring; and
the protrusion has a shape bent inward at a right angle at a height exceeding the diameter of the wire.

8. The manufacturing method according to claim 2, wherein:
the protrusions have a parallel and cylindrical shape up to a height being equal to a diameter of wire of the end turns of the compression coil spring; and
the protrusions have a shape bent inward at a right angle at a height exceeding the diameter of the wire.

9. The method of claim 1, wherein the tapered portion is at a height that exceeds a diameter of a wire for said compression coil spring.

10. The method of claim 1, wherein said forming said protrusion comprises:
punching a hole in said annular plate using a first punch having a first diameter;
forming a cylindrical protrusion around said hole using a second punch having a second diameter that is larger than said first diameter; and
forming the tapered portion.

11. The method of claim 1, further comprising:
forming another protrusion on another annular plate substantially similar to the protrusion on the annular plate; and
inserting said punch into a base portion of said another protrusion on said another plate to expand a tapered portion on said another protrusion.

12. A manufacturing method of a spring assembly, for assembling an annular plate and a compression coil spring, the method comprising:
forming a protrusion, which defines a hole, on the annular plate;
deforming a tip end of the protrusion to have a diameter smaller than that of a base portion of the protrusion by folding the tip end inwardly; and
inserting a punch, including a first portion having a larger diameter than an inner diameter of a tip end of the protrusion, from a tip end side of said protrusion toward a plate portion of said annular plate and into the protrusion to expand at least the tip end of the protrusion, wherein:
the expansion of the at least tip end of the protrusion involves expanding the base portion of the protrusion along a surface of an end turn of the compression coil spring, wherein the protrusion extends from the plate portion toward the tip end of the protrusion, wherein said diameter of said first portion of said punch is smaller than an inner diameter of said protrusion adjacent to said plate portion.

13. The method according to claim 12, wherein:
the annular plate comprises two annular plates;
the forming comprises forming the protrusion on each of annular plates;
the inserting comprises inserting the punch into the protrusion of one of the annular plates,
the method further comprising:
setting one end turn of the compression coil spring on the protrusion of the one of the annular plates;
setting the other end turn of the compression coil spring on the protrusion of the other of the annular plates; and
inserting the punch into the protrusion of the other of the annular plates through the expanded protrusion of the one of the annular plates to expand at least part of the protrusion of the other of the annular plates.

14. The manufacturing method according to claim 12, wherein:
the protrusion has a parallel and cylindrical shape up to a height being equal to a diameter of wire of an end turn of the compression coil spring; and
the protrusion has a tapered shape at a height exceeding the diameter of the wire.

15. The manufacturing method according to claim 13, wherein:
the protrusions have a parallel and cylindrical shape up to a height being equal to a diameter of wire of the end turns of the compression coil spring; and
the protrusions have a tapered shape at a height exceeding the diameter of the wire.

16. The manufacturing method according to claim 12, wherein:
the protrusion has a parallel and cylindrical shape up to a height being equal to a diameter of wire of an end turn of the compression coil spring; and
the protrusion has an inverse-tapered shape, which inclines inward and downward, at a height exceeding the diameter of the wire.

17. The manufacturing method according to claim 13, wherein:
the protrusions have a parallel and cylindrical shape up to a height being equal to a diameter of wire of the end turns of the compression coil spring; and
the protrusions have an inverse-tapered shape, which inclines inward and downward, at a height exceeding the diameter of the wire.

18. The manufacturing method according to claim 12, wherein:
the protrusion has a parallel and cylindrical shape up to a height being equal to a diameter of wire of an end turn of the compression coil spring; and
the protrusion has a shape bent inward at a right angle at a height exceeding the diameter of the wire.

19. The manufacturing method according to claim 13, wherein:
the protrusions have a parallel and cylindrical shape up to a height being equal to a diameter of wire of the end turns of the compression coil spring; and
the protrusions have a shape bent inward at a right angle at a height exceeding the diameter of the wire.

20. The method of claim 12, wherein said deforming a tip end of the protrusion comprises forming a tapered portion.

* * * * *